(12) United States Patent
Salter et al.

(10) Patent No.: US 11,932,153 B2
(45) Date of Patent: Mar. 19, 2024

(54) VEHICLE HAVING DEPLOYABLE SLIDING WORK DESK

(71) Applicant: Ford Global Technologies, LLC, Dearborn, MI (US)

(72) Inventors: Stuart C. Salter, White Lake, MI (US); Hussein H. Berry, Dearborn, MI (US); David Brian Glickman, Southfield, MI (US); Ryan Welch, Ottawa Lake, MI (US); Dustin Shedlarski, Commerce Township, MI (US); Micah Jones, Pleasant Ridge, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 77 days.

(21) Appl. No.: 17/826,462

(22) Filed: May 27, 2022

(65) Prior Publication Data

US 2023/0382285 A1 Nov. 30, 2023

(51) Int. Cl.
*B60N 3/00* (2006.01)

(52) U.S. Cl.
CPC .................................. *B60N 3/001* (2013.01)

(58) Field of Classification Search
CPC ..... B60N 3/001; B60N 3/002; B60R 11/0229; B60R 7/06; A47B 1/10; A47B 31/06; B60K 37/04; B62D 25/14
USPC ................................................. 296/37.12, 70
See application file for complete search history.

(56) References Cited

U.S. PATENT DOCUMENTS

| 2,845,315 | A | * | 7/1958 | McCoy | B60N 3/002 108/45 |
|---|---|---|---|---|---|
| 3,506,304 | A | * | 4/1970 | Smittle | B64D 11/0627 297/162 |
| 6,173,933 | B1 | * | 1/2001 | Whiteside | F16M 11/38 248/282.1 |
| 9,248,743 | B2 | | 2/2016 | Enthaler et al. | |
| 9,428,118 | B1 | | 8/2016 | Rawlinson | |
| 11,155,194 | B2 | * | 10/2021 | Hodgson | B60N 3/002 |
| 2002/0158448 | A1 | | 10/2002 | Okonkwo | |
| 2006/0011685 | A1 | * | 1/2006 | Tong | B60N 3/002 224/543 |
| 2016/0257264 | A1 | * | 9/2016 | Rawlinson | B60N 3/001 |

(Continued)

FOREIGN PATENT DOCUMENTS

DE 102018006580 A1 2/2019
DE 102020200409 A1 * 7/2021

(Continued)

OTHER PUBLICATIONS

Amazon—Aluminum Caster Wheels 10032018 (Year: 2018).*

(Continued)

*Primary Examiner* — Amy R Weisberg
*Assistant Examiner* — Wenwei Zhuo
(74) *Attorney, Agent, or Firm* — Vichit Chea; Price Heneveld LLP (57) ABSTRACT

A vehicle includes a body defining a cabin having an interior and a passenger door, an interior panel located in the interior, a track located in the passenger door within the interior, and a desk operably housed in a slot in the interior panel and slidably coupled to the slot in the interior panel and the track to move between a stowed position within the interior panel and a use position extending outward from the interior panel.

18 Claims, 6 Drawing Sheets

(56) References Cited

U.S. PATENT DOCUMENTS

| | | | | |
|---|---|---|---|---|
| 2016/0274674 A1* | 9/2016 | Valdes | ............. | B64D 11/00152 |
| 2017/0313229 A1* | 11/2017 | Isernio | ..................... | B60N 2/78 |
| 2018/0281652 A1* | 10/2018 | Foohey | ................. | A47B 83/02 |
| 2019/0143869 A1* | 5/2019 | Sequi | ................. | B60R 13/0243 |
| | | | | 296/152 |
| 2019/0241205 A1* | 8/2019 | Toyama | ............... | B60N 2/0244 |

FOREIGN PATENT DOCUMENTS

| | | | | | |
|---|---|---|---|---|---|
| DE | 102020200409 | A1 | | 7/2021 | |
| FR | 2806042 | A1 | * | 9/2001 | ............. B60K 37/00 |
| JP | 2011079356 | A | * | 4/2011 | ............. B60N 3/002 |

OTHER PUBLICATIONS

Witteler Julian, DE_102020200409_A1_I machine translation, Jul. 15, 2021 (Year: 2021).*

Asensio et al., FR_2806042_A1_I machine translation, Sep. 14, 2001 (Year: 2001).*

Kuno Akira, JP_2011079356_A_I machine translation, Apr. 21, 2011 (Year: 2011).*

* cited by examiner

VEHICLE HAVING DEPLOYABLE SLIDING WORK DESK

FIELD OF THE DISCLOSURE

The present disclosure generally relates to passenger vehicles, and more particularly relates to a work table that is deployable within the cabin interior of a vehicle.

BACKGROUND OF THE DISCLOSURE

Motor vehicles are commonly configured with a cabin interior having passenger seating for transporting passengers. In some situations, passengers may want a work space in the vehicle. It would be desirable to provide for a convenient to store and deploy work surface within the cabin compartment.

SUMMARY OF THE DISCLOSURE

According to a first aspect of the present disclosure, a vehicle is provided and includes a body defining a cabin having an interior and a passenger door, an interior panel located in the interior of the cabin, and a track located in the passenger door within the interior of the cabin. The vehicle also includes a desk operably housed in the interior panel and slidably coupled to a slot in the interior panel and the track to move between a stowed position within the interior panel and a deployed position extending outward from the interior panel.

Embodiments of the first aspect of the present disclosure can include any one or a combination of the following features:
  the interior panel comprises a dashboard located generally forward of a seat in the vehicle, and wherein the passenger door is generally located on a lateral side of the seat;
  a steering wheel located between the seat and the dashboard, wherein the steering wheel is movable to a stowed position when the desk is in the deployed position;
  the desk has a support arm extending toward and coupled to the track;
  the support arm is operatively coupled to a roller that engages the track;
  the roller comprises a wheel;
  the roller comprises a chamfered tip disposed within a channel forming the track;
  a display located proximate the interior panel;
  the display is deployable between a lower position that covers an open end of the slot and an upper position that exposes the open end of the slot;
  a spring biasing the desk toward the extended deployed position;
  the desk comprises a work surface having a keyboard comprising capacitive sensors; and
  the desk comprises an inductive charger.

According to a second aspect of the present disclosure, a vehicle is provided and includes a body defining a cabin having an interior and a passenger door, a seat, a dashboard located in the interior of the cabin forward of the seat, and a slot formed in the dashboard. The vehicle also includes a track located in the passenger door within the interior of the cabin, and a desk operably housed in the dashboard and slidably disposed in the slot in the dashboard and operatively coupled via a support arm to the track to move the desk between a stowed position within the dashboard and a deployed position extending outward from the dashboard.

Embodiments of the second aspect of the present disclosure can include any one or a combination of the following features:
  a roller coupled to the support arm and having a chamfered tip disposed within a channel forming the track;
  a display located proximate the dashboard;
  the display is deployable between a lower position that covers an open end of the slot and an upper position that exposes the open end of the slot;
  a steering wheel located between the seat and the dashboard, wherein the steering wheel is movable to a stowed position when the desk is in the deployed position;
  a spring biasing the desk toward the extended deployed position;
  the desk comprises a work surface having a keyboard comprising capacitive sensors; and
  the desk comprises an inductive charger.

These and other features, advantages, and objects of the present invention will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
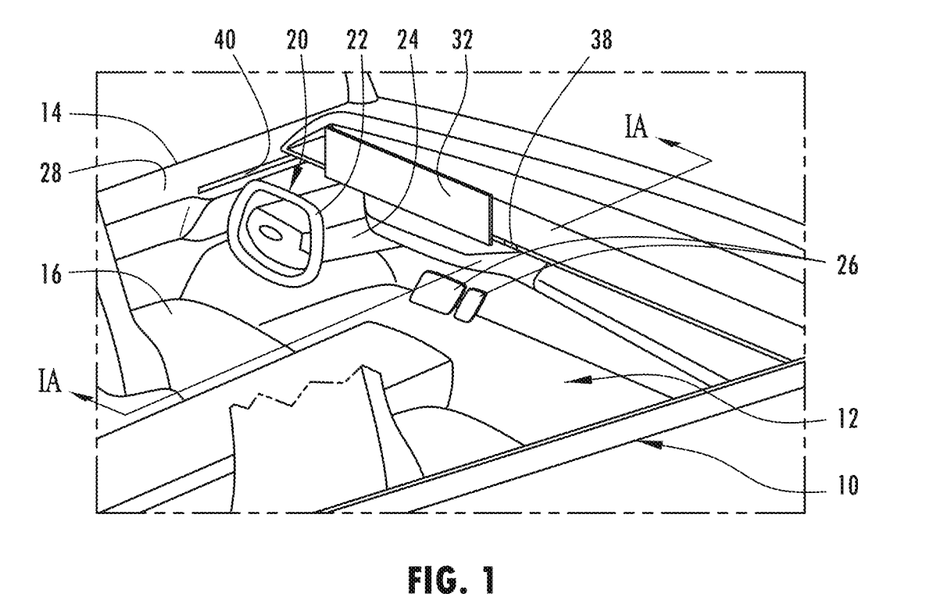
FIG. 1 is a perspective view of a cabin interior of a motor vehicle having a deployable desk in a stowed position, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a deployable work table. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating and accommodations for transporting one or more passengers including a driver of the vehicle 10. The motor vehicle 10 has a vehicle body that generally defines a cabin interior 12. The cabin interior 12 may contain various features and trim components within the vehicle body. The cabin interior 12 is shown having an arrangement of passenger seats including a first driver seat 16 which may be configured as a bench or captain seats, for example. The vehicle 10 may also include additional seating as is common for a typical large SUV, van or bus. It should be appreciated that the vehicle 10 may be a motor vehicle, such as a wheeled car, truck, SUV, van or bus, for example, or an airplane, train, boat or other vehicle capable of transporting one or more passengers.

The motor vehicle 10 is illustrated having the driver seat 60 located rearward of a front dashboard 18 that generally defines an interior panel generally located at or proximate to a front portion of the cabin interior 12 which is typically vehicle rearward of a front windshield. The dashboard 18 may include various trim panel components and instruments and may also be referred to as an instrument panel. Located vehicle forward the driver seat 16 and rearward of the dashboard 18 is a steering wheel 20 which has a steering rim 22 and a steering column 24 connected thereto. The steering wheel 20 may be engaged by a driver seated in seat 16 to steer vehicle wheels and hence the vehicle 10 as is readily apparent to one in the art. The steering wheel 20 may be a collapsible steering wheel, such as, for example, where the steering rim 22 may fold to a flat position, thereby lowering the top edge of the steering rim 22 when the vehicle 10 is not operated by the driver. In addition, the steering column 24 may collapse in a telescoping manner forward of the vehicle 10, such that the steering wheel 20 may be stowed when the vehicle 10 is not in use, for example. In addition, the vehicle 10 is shown having a pair of operator pedals 26 located forward of the seat 16 proximate or above the underlying floor. The operator pedals 26 may include an accelerometer pedal and a brake pedal, for example. The operator pedals 26 may likewise be stowable into a stowed position when the vehicle 10 is not in use, thereby providing more open space for the driver of the vehicle 10 when the vehicle is not operated by the driver.

The vehicle 10 further includes a side entry door 14 located in the body of the vehicle 10 proximate to the lateral side of seat 16. Door 14 may pivot about a front hinge between an open position which allows access to the cabin interior 12 and a closed position which closes the cabin interior 12. The door 14 may include a trim panel 28 on the interior side. Formed within the trim panel 28 of the door 14 is a recessed track 40 that extends generally horizontal and longitudinally. The track 40 is provided to support a deployable desk 30 that may be deployed outward or rearward from the dashboard 18 to provide a work surface.

Figure 1A:
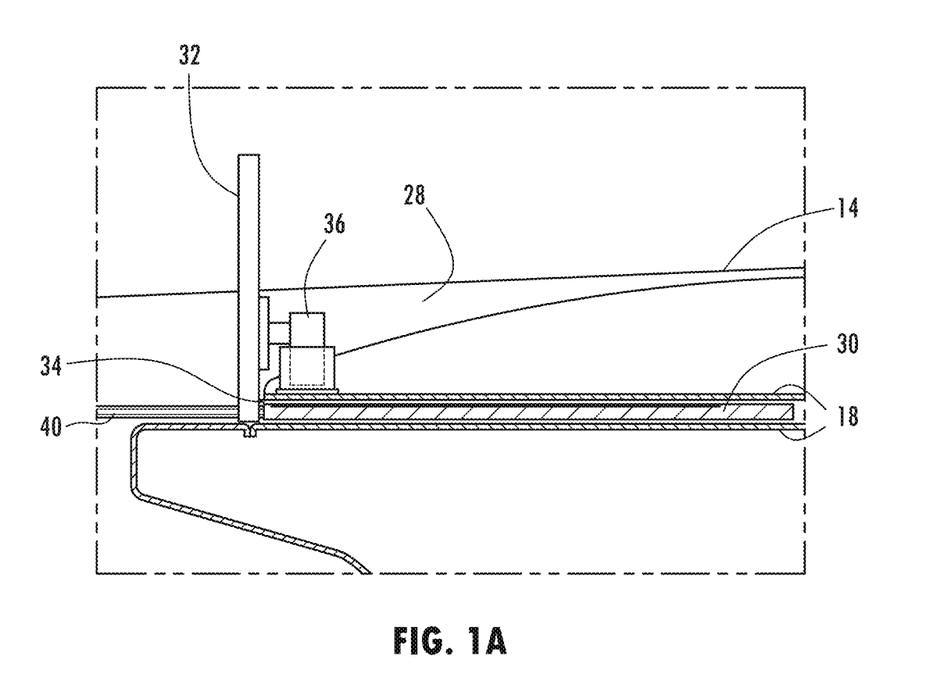
FIG. 1A is a cross-sectional view taken through line IA-IA of FIG. 1 further illustrating the desk in the stowed position.

The deployable desk 30 is illustrated in FIG. 1A shown hidden or concealed in a stowed position stored within a slot 34 in dashboard 18. The slot 34 extends longitudinally from the vehicle rear side of the dashboard forward relative to the vehicle 10 and allows the desk 30 to move longitudinally within the slot 34 between the stowed and deployed positions.

The vehicle 10 is also shown having a display 32 located forward of the seat 16 and shown supported on the dashboard 18 via a display mount 36. The display 32 may move between a lowered position shown in FIG. 1A and a raised position shown in FIGS. 2A and 3A. In order to move the display 32 between the lowered and raised positions, the display mount 36 may be forcibly actuated. In one example, the display mount 36 may be actuated manually by a user. In another example, the display mount 36 may include a motor or other actuator to actuate the display 32 between the raised and lowered positions. In the lowered position, the lower edge of display 32 is shown substantially concealing the open end of slot 34 to thereby contain and hide the desk 30 in the stowed position.

Figure 2:
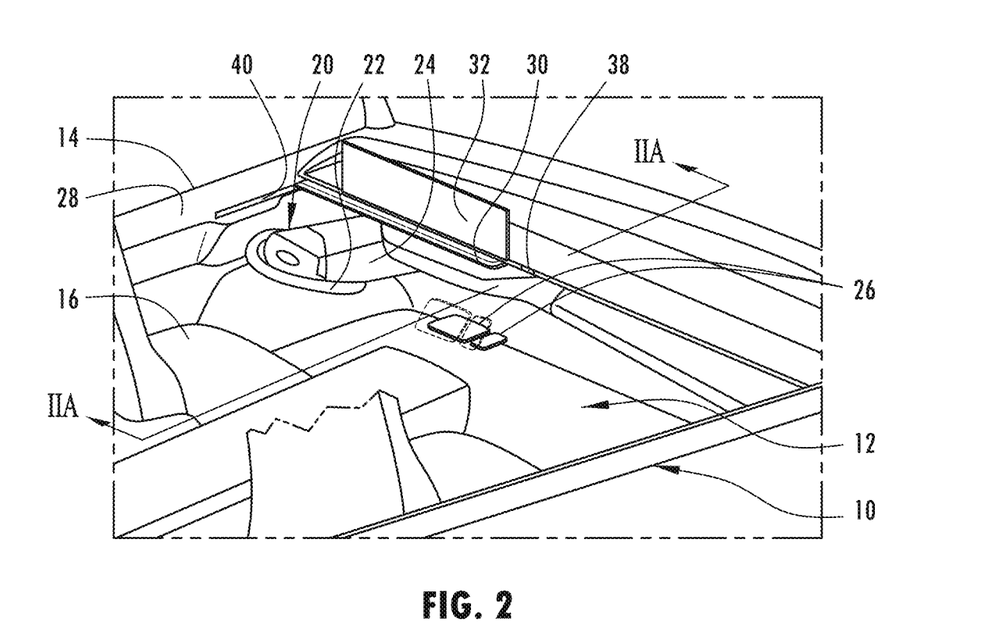
FIG. 2 is a perspective view of the cabin interior of the vehicle showing the desk in a partially deployed position.
Figure 2A:
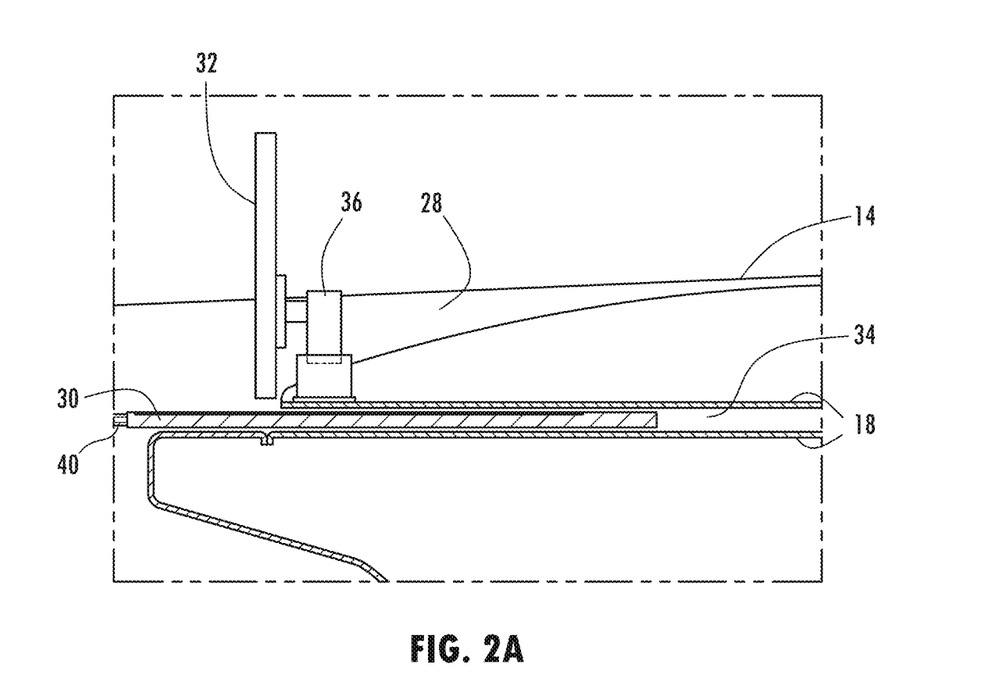
FIG. 2A is a cross-sectional view taken through line IIA-IIA of FIG. 2 further illustrating the desk in the partially deployed position.

The deployable desk 30 may be accessed and deployed to a use position by raising the display 32 with the display mount 36 to a raised position as seen in FIGS. 2 and 2A. With the display 32 in the raised position, the desk 30 may be deployed to slide outward or vehicle rearward of the dashboard 18. In the example shown, the steering wheel 20 is moved to the stowed position prior to desk deployment to provide uninterrupted space for the desk 30 to slide out to the deployed position above the stowed steering wheel 20. It should be appreciated that the vehicle 10 may be locked-out in park and not moving when the desk 30 is deployed. It is anticipated that technology and the regulatory framework may evolve in the future to where using the desk in a moving vehicle becomes safe and permissible.

Figure 3:
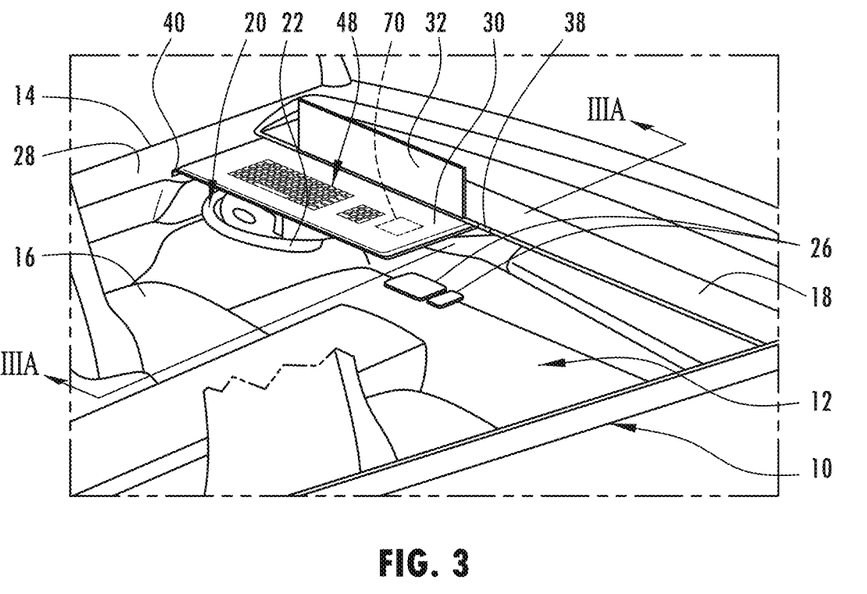
FIG. 3 is a perspective view of the cabin interior showing the desk in a fully deployed position.
Figure 3A:
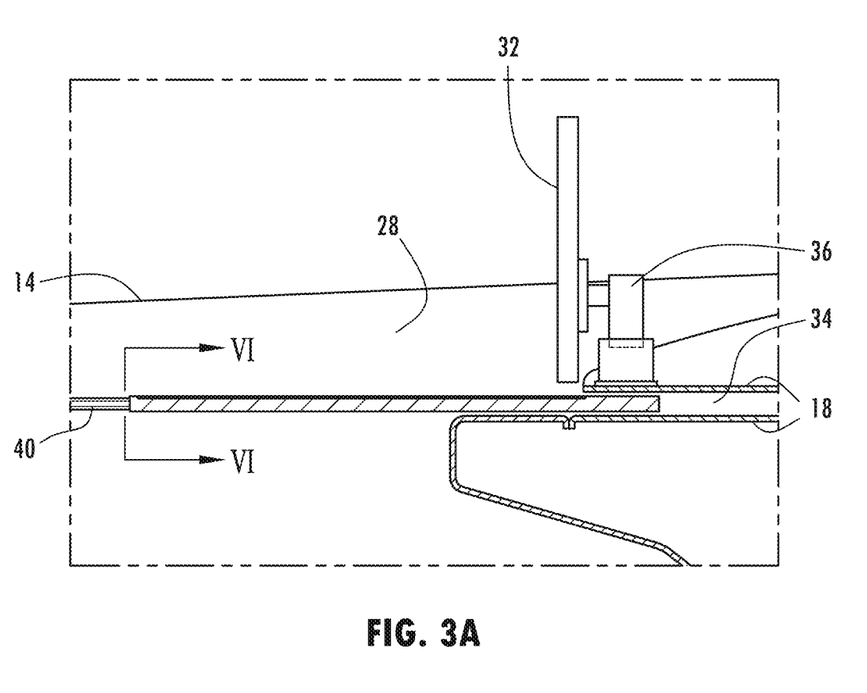
FIG. 3A is a cross-sectional view taken through line IIIA-IIIA of FIG. 3 further illustrating the desk in the fully deployed position.

The deployable desk 30 may be slidingly moved to a fully deployed position as shown in FIG. 3 in which the desk 30 is substantially positioned above the stowed steering wheel 20. It should be appreciated that the desk 30 has a support arm engaged within track 40 of door 14 to provide support on the lateral door side of the desk 30. When the door 14 is in the closed position, the desk 30 is fully supported on the lateral door side by the support arm in the track 40. It should be appreciated that the door 14 may pivot outward to an open position in which the desk 30 is not supported by an interference fit with the track 40 but remains supported by the slot 34 within the dashboard 18. When the door 14 is moved back to the closed position, the support arm via the roller bearing wheel on the lateral edge of the desk 30 reengages and aligns with the track 40.

The deployable desk 30 may include a keyboard, such as a capacitive keyboard 48 having capacitive sensors or other proximity sensors, formed on the upper work surface as shown in FIG. 3. The capacitive keyboard 48 may include an array of proximity sensors having various keypad regions defining the characters of the keyboard in this example. It should be appreciated that the keyboard 48 may include other proximity sensors, or may employ mechanical push-buttons, according to other examples. The keyboard 48 may be operatively coupled to the display 32 to communicate therewith. The desk 30 may further include an inductive charger 70 integrated into the work surface for charging one or more rechargeable batteries and battery-operated devices.

The deployable desk 30 may be deployed between the stowed position and the deployed positions with the use of an actuator, such as a motor, according to one embodiment. In this embodiment, a user input button 38 may be employed which is shown located on the dashboard 18. A user may actuate the user input button 38 to activate a motor to actuate the desk 30 between the stowed and deployed positions. According to another embodiment, the deployable desk 30 may be actuated manually by a user.

Figure 4:
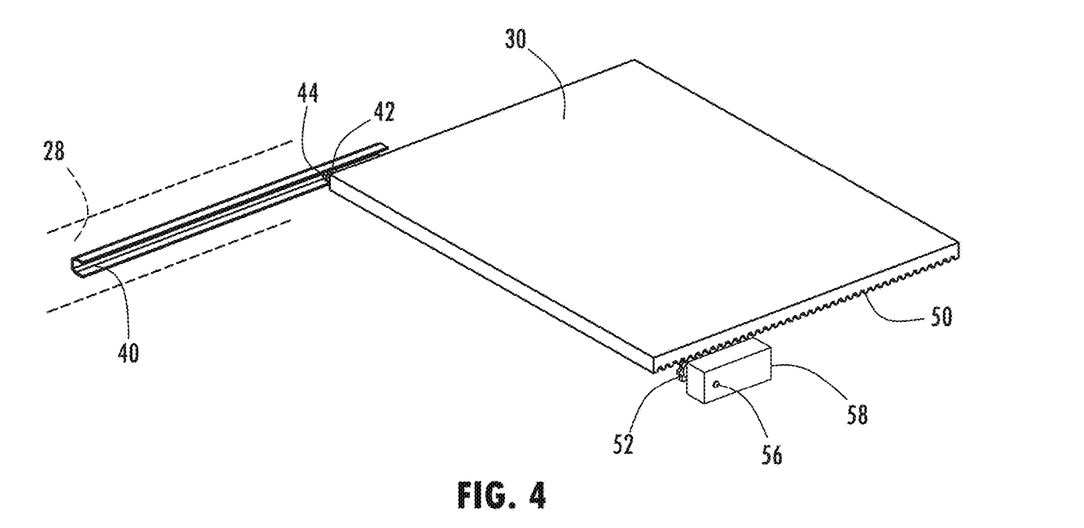
FIG. 4 is an enlarged perspective view of the desk shown in a stowed position and actuatable by a motor, according to one embodiment.
Figure 4A:
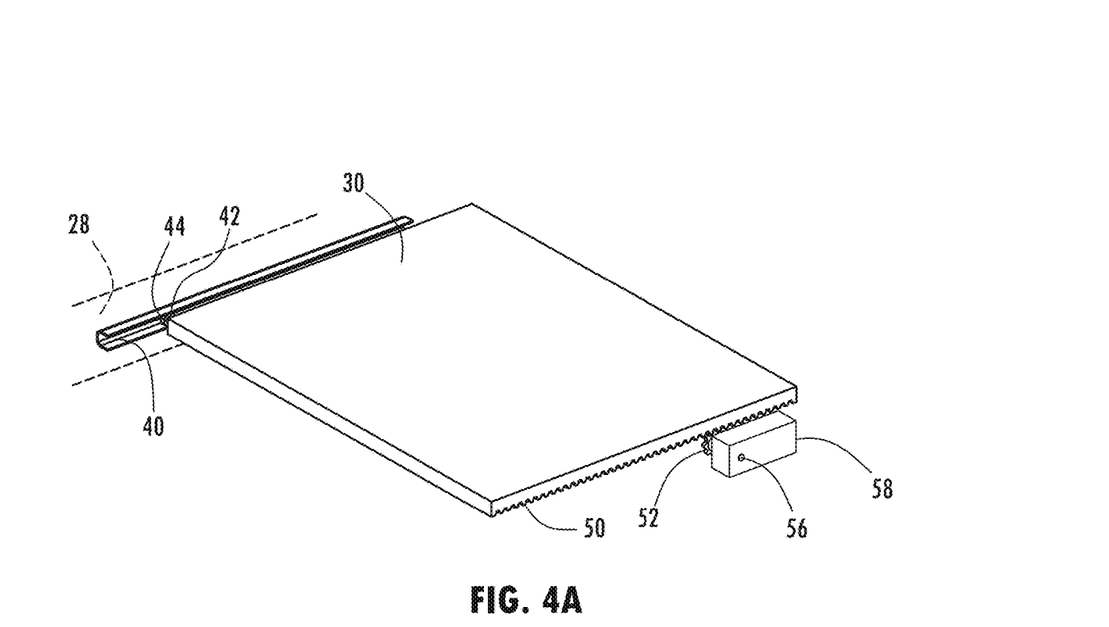
FIG. 4A is a perspective view of the desk shown in FIG. 4 with the desk in a deployed position.

Referring to FIGS. 4 and 4A, the deployable desk 30 is illustrated according to one embodiment having a motor for actuating the desk 30 between the deployed and stowed positions. The motor 58 may be an electric motor and is shown driving a motor shaft 56 which, in turn, rotates a wheel 54 having teeth 52. Teeth 52 are matingly engaged with teeth 50 on the bottom edge of the desk 30. As such, the motor 58 may be activated to drive the desk 30 between the deployed and stowed positions in response to a user input.

Figure 5:
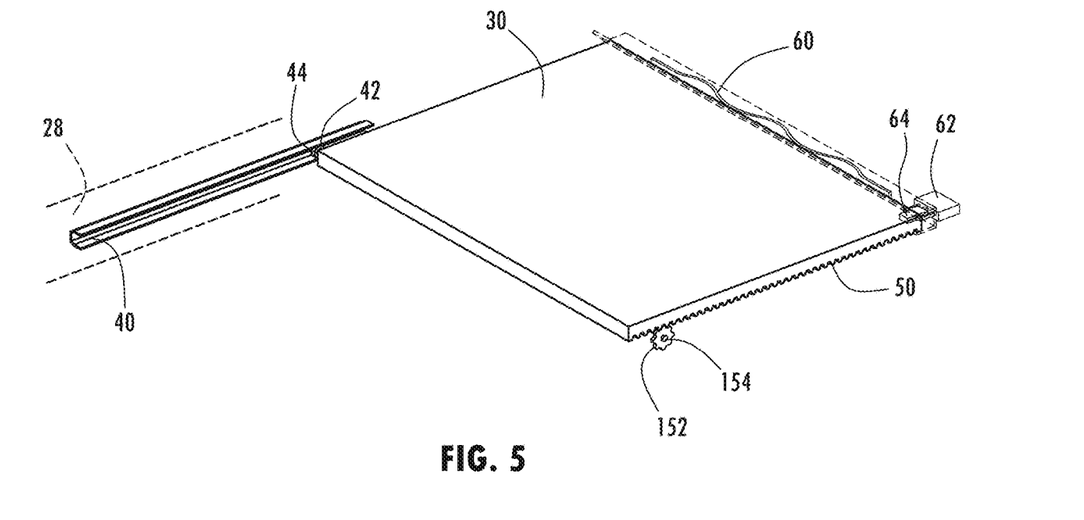
FIG. 5 is an enlarged perspective view of the desk shown in a stowed positon and manually deployable, according to another embodiment.
Figure 5A:
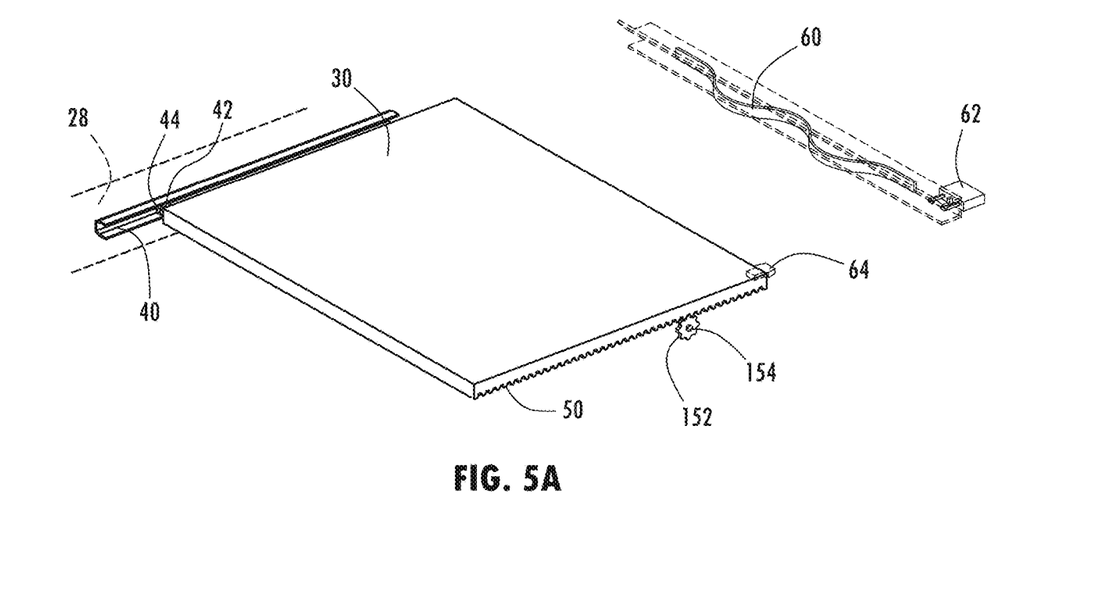
FIG. 5A is a perspective view of the desk shown in FIG. 5 with the desk in a deployed position.

Referring to FIGS. 5 and 5A, the deployable desk 30 is shown manually actuatable according to another embodiment. In this embodiment, the desk 30 may have teeth 50 on the bottom lateral edge which matingly engages teeth 152 on a free-spinning rotary wheel 154. The desk 30 further includes a striker 64 on the front edge which may engage a latch 62 within the dashboard 18 to retain the desk 30 in the fully stowed position. The latch 62 and striker 64 may be a push-push type latch, according to one example. It should be appreciated that other latching components and arrangements may be employed to connect and latch the desk 30 in the stowed position. A spring 60, such as a wave spring, is further shown disposed between the dashboard 18 within a chamfered channel in the slot 34 and the vehicle forward edge of the desk 30. Spring 60 compresses to provide a bias force when the desk 30 is in the fully stowed position. Upon unlatching the desk via the latch 62, spring 60 will bias force the desk 30 vehicle rearward towards a user seated in seat 16. A user may then engage and further pull the desk 30 outward toward the fully deployed use position.

Figure 6:
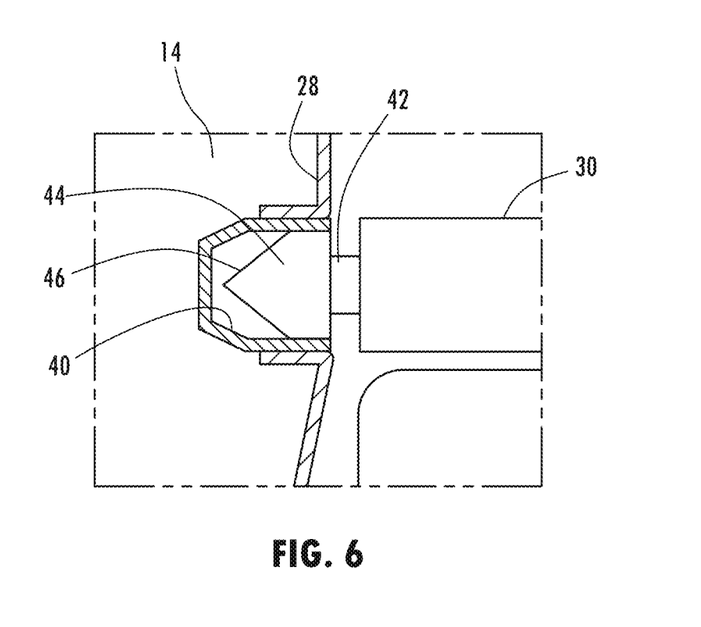
FIG. 6 is an enlarged view of a portion of the table supported in a track in the vehicle door with a roller bearing wheel.

Referring to FIG. 6, the deployable desk 30 is shown having the support arm 42 extending laterally from the lateral door side edge proximate to the door 14. The door 14 includes a trim panel 28 having a channel that provides the track 40 formed therein. The support arm 42 is connected to a roller bearing or wheel 44 that is configured to engage the track 40 when the door 14 is in the closed position. As such, wheel 44 acts as a roller bearing as it rotates to allow the desk 30 to slide easily with low friction between the stowed and deployed use positions. The wheel 44 further has a chamfered tip on the door side that forms a conical tip to allow the wheel 44 to easily align and reengage within the track 40 as the door 14 is opened and closed, repeatedly.

Accordingly, a vehicle 10 is provided with a deployable desk 30 operably housed within an interior panel, such as a dashboard 18, and slidably coupled to the interior panel and a track 40 in the door 14 to move between a stowed position within the interior panel and a use position extending outward from the interior panel. As such, a user may deploy the desk 30 to provide a work surface when needed and may stow the desk 30 when not needed. While the deployable desk 30 is shown and described herein as a desk that is deployed in front of a driver of the vehicle, it should be appreciated that the deployable desk 30 may be located at other locations within the vehicle 10, such as forward of a passenger seat in the front or rear or other portions of the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a body defining a cabin having an interior and a passenger door;
   a seat located in the interior of the cabin, wherein the passenger door is generally located on a lateral side of the seat;
   an interior panel comprising a dashboard located in the interior of the cabin forward of the seat;
   a track located in the passenger door within the interior of the cabin; and
   a desk operably housed in the interior panel and slidably coupled to a slot in the interior panel and the track to move between a stowed position within the dashboard and a deployed position extending outward from the dashboard, wherein the desk has a support arm extending toward and movably coupled to the track such that the track supports the desk in the deployed position.

2. The vehicle of claim 1 further comprising a steering wheel located between the seat and the dashboard, wherein the steering wheel is movable to a stowed position when the desk is in the deployed position.

3. The vehicle of claim 1 wherein the support arm is operatively coupled to a roller that engages the track.

4. The vehicle of claim 3, wherein the roller comprises a wheel.

5. The vehicle of claim 4, wherein the roller comprises a chamfered tip disposed within a channel forming the track.

6. The vehicle of claim 1 further comprising a display located proximate the interior panel.

7. The vehicle of claim 6, wherein the display is deployable between a lower position that covers an open end of the slot and an upper position that exposes the open end of the slot.

8. The vehicle of claim 1 further comprising a spring biasing the desk toward the extended deployed position.

9. The vehicle of claim 1, wherein the desk comprises a work surface having a keyboard comprising capacitive sensors.

10. The vehicle of claim 1, wherein the desk comprises an inductive charger.

11. A vehicle comprising:
    a body defining a cabin having an interior and a passenger door;
    a seat;
    a dashboard located in the interior of the cabin forward of the seat;
    a slot formed in the dashboard;
    a track located in the passenger door within the interior of the cabin; and
    a desk operably housed in the dashboard and slidably disposed in the slot in the dashboard and operatively coupled via a support arm to the track to move the desk between a stowed position within the dashboard and a deployed position extending outward from the dashboard, the desk further comprising a roller coupled to the support arm and having a chamfered tip disposed within a channel forming the track.

12. The vehicle of claim 11 further comprising a display located proximate the dashboard.

13. The vehicle of claim 12, wherein the display is deployable between a lower position that covers an open end of the slot and an upper position that exposes the open end of the slot.

14. The vehicle of claim 12 further comprising a steering wheel located between the seat and the dashboard, wherein the steering wheel is movable to a stowed position when the desk is in the deployed position.

15. The vehicle of claim 11 further comprising a spring biasing the desk toward the extended deployed position.

16. The vehicle of claim 11, wherein the desk comprises a work surface having a keyboard comprising capacitive sensors.

17. The vehicle of claim 11, wherein the desk comprises an inductive charger.

18. The vehicle of claim 1 further comprising a roller coupled to the support arm and having a chamfered tip disposed within a channel forming the track.

* * * * *